(12) United States Patent
Fellinger

(10) Patent No.: US 7,828,538 B2
(45) Date of Patent: Nov. 9, 2010

(54) METHOD AND APPARATUS FOR INCREASING AN INTRINSIC VISCOSITY OF POLYESTER

(76) Inventor: Markus Fellinger, Grossdörnbachstrasse 13, A-4073 Wilhering (AT)

( * ) Notice: Subject to any disclaimer, the term of this patent is extended or adjusted under 35 U.S.C. 154(b) by 1261 days.

(21) Appl. No.: 10/494,012

(22) PCT Filed: Oct. 15, 2002

(86) PCT No.: PCT/AT02/00294

§ 371 (c)(1), (2), (4) Date: Jun. 8, 2004

(87) PCT Pub. No.: WO03/037588

PCT Pub. Date: May 8, 2003

(65) Prior Publication Data

US 2005/0062186 A1    Mar. 24, 2005

(30) Foreign Application Priority Data

Oct. 29, 2001   (AT) ............................. A 1706/2001

(51) Int. Cl.
*B29B 9/06* (2006.01)
*B29B 9/16* (2006.01)

(52) U.S. Cl. .................. 425/67; 425/203; 425/313; 425/377; 425/404; 425/445

(58) Field of Classification Search ............ 425/67, 425/68, 70, 203, 310, 311, 313, 315, 316, 425/377, 404, 445
See application file for complete search history.

(56) References Cited

U.S. PATENT DOCUMENTS

| | | | |
|---|---|---|---|
| 3,343,213 A | * | 9/1967 | Fritsch ....................... 425/313 |
| 3,544,525 A | | 12/1970 | Balint et al. |
| 4,606,873 A | * | 8/1986 | Biglione et al. ............... 264/53 |
| 4,632,564 A | * | 12/1986 | Kopernicky .................. 366/75 |
| 5,609,892 A | * | 3/1997 | Garcia et al. ................ 425/311 |
| 6,296,930 B1 | * | 10/2001 | Ohbe et al. ............. 428/304.4 |

(Continued)

FOREIGN PATENT DOCUMENTS

DE    1 905 677    10/1969

OTHER PUBLICATIONS

Holman, J. P., Heat Transfer, 7th Edition, (C) 1990, McGraw-Hill, Inc., New York, pp. 29-30.*

*Primary Examiner*—Yogendra N Gupta
*Assistant Examiner*—Joseph Leyson
(74) *Attorney, Agent, or Firm*—Townsend and Townsend and Crew, LLP

(57) ABSTRACT

A method of increasing the intrinsic viscosity of polyester by means of solid state polymerization, wherein a polyester plastics melt is granulated and after granulation is conveyed into a thermal treatment container (13) for thermal treatment therein, the granules being produced slightly below their melting temperature and being fed into the thermal treatment container (13) immediately after granulation so as to utilize the residual heat in the granules, as well as an arrangement for increasing the intrinsic viscosity of polyester by means of solid state polymerization with a granulating and a thermal treatment unit, with an unheated, thermally insulated container (13) or a container (13) having wall heating means (15) being provided as the thermal treatment unit, which is directly connected to the granulating unit via a conveying device (11, 36, 37).

15 Claims, 6 Drawing Sheets

U.S. PATENT DOCUMENTS 6,592,350 B1 * 7/2003 Chszaniecki .................. 425/67
7,358,328 B2 * 4/2008 Fellinger et al. ............ 528/480
2002/0036361 A1 * 3/2002 Borer et al. .............. 264/37.14

* cited by examiner

METHOD AND APPARATUS FOR INCREASING AN INTRINSIC VISCOSITY OF POLYESTER

BACKGROUND OF THE INVENTION

Field of the Invention

The invention relates to a method for increasing the intrinsic viscosity of polyester by means of solid state polymerization, wherein a polyester plastics melt is granulated and after granulation is conveyed into a thermal treatment container for thermal treatment therein, as well as to an arrangement for increasing the intrinsic viscosity of polyester by means of solid state polymerization, comprising a granulating and a thermal treatment unit.

High-molecular polyesters, such as, e.g., PET and PEN, usually are produced by melt polymerization or by solid state polymerization or by a combination of both procedures, from low-molecular polyester starting materials. With the help of these methods, the relatively low intrinsic viscosity (IV) of the polyester melt is increased. In the melt polymerization, the polyester melt is processed at temperatures around approximately 270° C. to 280° C. for approximately 30 min to 5 h under a high vacuum of approximately 1 mbar. What is detrimental in this case is that due to the high processing temperatures, a degradation process of the polyester will occur, and that in case of excessively long processing times above the melting temperature, the polyester will become yellow. Moreover, the intrinsic viscosity values attainable thereby are limited.

During the solid state polymerization, the polyester melt usually is extruded through several nozzles, and the plastics strands forming thereby are subsequently cooled in a water bath. After curing of the plastics strands, the latter are granulated, i.e. cut to a granular material. The granular polyester material thus is provided in an amorphous state and fed to a so-called crystallizer, in which the granules are brought to a temperature beyond the crystallizing temperature (approximately 100° C. to 130° C.) under vigorous stirring so as to prevent a sticking together of the granules in the solid state polymerization container. The granular material then first is heated in the solid state polymerization container to approximately from 220° C. to 250° C. by means of an inert gas flow or under a vacuum of between 0.5 and 2 mbar by means of heating elements, and then is kept under these conditions for approximately 1-40 h until the desired intrinsic viscosity has been achieved.

From U.S. Pat. No. 5,391,694 A, a method for solid state polymerization is known in which an improved reaction time for increasing the intrinsic viscosity of the granular material is to be achieved in a solid state polymerization container by means of a granular material with recesses open at the end-side.

On the other hand, according to U.S. Pat. No. 4,755,587 A, the granular material is shaped to porous pills so as to produce a high-molecular polyester.

In EP 0 856 537 A, a method for producing polyethylene terephthalate (PET) having an increased, heterogeneous intrinsic viscosity is described, wherein different PET materials having highly diverging intrinsic viscosities are used as the starting material, which are processed in a two-stage solid-state polymerization method. At first, the PET and PVC materials are cut or chopped to platelets (particles), and subsequently they are heated for approximately 3.5 h at 130° C. With this thermal treatment, the PET particles are merely dried, the PVC particles, however, become brown, whereafter the PVC particles can be separated with the help of a color-sensitive camera. Then the PET particles are separately heated to approximately 220° C. in a container in a nitrogen environment. Subsequently, they are conducted into a container for the second stage of the solid-state polymerization, in which they must be heated for further 4 h to 220° C. Thus, this method requires a repeated energy-intensive heat supply.

In DE 40 32 510 A, a method for continuously producing polyester resin of a high molecular weight is described, wherein, however, it is merely disclosed in detail how a mixture of pyromellitic acid dianhydride is fed into a crystallized PET powder.

From DE 43 09 227 A, a continuous method for producing polyester is known in which the polycondensate is granulated and the granules at first are hardened as well as crystallized and only then are polycondensated in the solid state. In a container, the granules are subjected to a temperature of around 30° C. for hardening purposes in air, $CO_2$, $N_2$ or other mixtures whose dew point is below the treatment temperature, until the temperature of the first softening of the polyester has risen by about 4° C. to 8° C. relative to the original temperature. Thus, also here a high energy consumption prevails due to the cooling for hardening the granules and the subsequent heating.

The known solid state polymerization methods have the disadvantage that complex heating and mixing means are required for heating the granules usually to between 200° C. and 250° C. in the solid state polymerization container, apart from the fact that also the energy consumption is a very high one.

SUMMARY OF THE INVENTION

Therefore, it is an object of the invention to provide a method and an arrangement of the initially defined kind, by which the energy consumption can be kept as low as possible and, moreover, complex heating means in the solid state poylmerization container are not required.

In a method of the initially defined kind, this is achieved in that the granules are produced slightly below their melting temperature and are fed into the thermal treatment container immediately after granulation, so as to utilize the residual heat prevailing in the granules.

To keep the plastics material as warm as possible during granulation and thus to keep as low as possible the energy consumption required for the subsequent heating in the thermal treatment container, in the present method the granules are prepared only slightly below their melting temperature, a crystallized outer layer or outer shell forming, while the plastics material on the inside is still viscous. With the help of the direct, immediate conveying of the granules upon their production to a neighboring thermal treatment container, the residual heat stored in the granules can be utilized, whereby the energy consumption required for solid state polymerization can be reduced. Moreover, also complex heating techniques are not required.

Granulation at a temperature which is merely slightly below the melting temperature can be adjusted in a simple manner if the granules are produced by means of a cutter rotor rotating in a liquid.

If the granules are separated from the liquid immediately after their production, the granules are cooled in their outermost layer to below the solidifying temperature in a simple manner, whereby a considerable residual heat is stored in the granules.

When the granules melt, the polyester melt prepared by means of a single screw, double screw or multiple screw extruder tends to undergo a so-called hydrologic degradation, by which the water molecules present in the melt can lead to a loss of viscosity of the polyester. To counteract this loss of viscosity, it is suitable if the polyester starting material is dried prior to granulation.

Likewise, for a gentle processing of the polyester starting material, it is advantageous if the polyester plastics melt is evacuated prior to granulation with a negative pressure, preferably between 1 and 40 mbar, since thus the decrease of the intrinsic viscosity during the extrusion of the polyester starting material can be kept as low as possible.

If the melt viscosity is measured in the extruder or at the emergence from the thermal treatment container, it is possible in an advantageous manner to control the dwell time in the thermal treatment container, and thus, the IV value, in dependence on the intrinsic viscosity of the polyester prior to granulation, or after the thermal treatment, respectively.

Tests have shown that particularly high intrinsic viscosities are obtained with relatively short dwell times in the thermal treatment container if a negative pressure of preferably substantially from 1 to 3 mbar is caused in the thermal treatment container.

To keep the temperature of the granules after their emergence from the granulating device as high as possible, it is advantageous if the granules are heated while they are being fed into the thermal treatment container.

The arrangement according to the invention and of the initially defined kind is characterized in that an unheated, thermally insulated container or a container having wall heating means is provided as the thermal treatment unit, which is directly connected to the granulating unit via a conveying device. By the direct connection of the granulating unit with the thermal treatment unit via a conveying device, the granules which have not yet cooled to much below their melting temperature can be conveyed into a thermal treatment container immediately after their production, by utilizing the residual heat stored in the granules. Since no substantial heating of the still warm granules is required, the thermal treatment container can be constructed in a relatively simple manner as compared to the prior art, a thermally insulated container or a container equipped with simple wall heating means being sufficient. By this, an arrangement of simple construction which, moreover, is energy saving, is created to increase the intrinsic viscosity of polyester.

To obtain a material mixed as uniform as possible, particularly in case of discontinuous feeding of the container with granules, it is advantageous if at least one mixing element is provided in the container, wherein the former, if possible, shall mix the granules in the entire container. Of course, also any desired mixing elements, such as, e.g., stirring elements, or also so-called tumble-driers, can be used. Particularly if the container is continuously fed, it is advantageous if the mixing element is heatable so as to heat the introduced granules also in the interior of the container.

If the thermal treatment container is filled with an inert gas, e.g. nitrogen, the method advantageously will proceed practically faultlessly, and, moreover, the inert gas may at the same time be used as the heat carrying medium.

To separate the granules as immediately upon their production as possible from a coolant introduced into the cutting chamber, and thus, to store as much residual heat in the granules as possible, it is advantageous if the granulating unit comprises a screening device directly bordering on the cutting chamber.

For a reliable temperature regulation slightly below the melting temperature of the polyester material provided for granulation, it is suitable if the granulating unit comprises a cutting chamber filled with liquid.

To produce the granules at temperatures as high as possible, slightly below the melting temperature, it is advantageous if the liquid provided in the cutting chamber has a higher boiling point than water at ambient pressure, this, for instance, being made possible in a simple manner if the liquid is a water/glycol mixture.

To increase the boiling temperature of the coolant introduced into the cutting chamber and to thus allow for a production of the granules at a relatively high temperature, it is suitable if the cutting chamber is a pressure chamber.

To prevent cooling of the granules during their conveyance from the granulating unit to the thermal treatment unit, if possible, it is advantageous if the conveying device is thermally insulated. Moreover, it is also possible for the conveying device to be heatable so as to introduce the granules with as high a temperature as possible into the thermal treatment unit.

If a pre-drying unit, preferably a vacuum dryer, hot air dryer or the like is arranged upstream of the granulating unit, optionally upstream of a preceding extruder, viewed in the conveying direction, the number of the water molecules present in the melt which, on account of the so-called hydrologic degradation, will lead to a loss in viscosity of the polyester, can be reduced.

To process the polyester starting material as gently as possible and to keep as low as possible the reduction of the intrinsic viscosity during the extrusion of the polyester starting material, it is suitable if an extruder arranged upstream of the granulating unit comprises at least one degassing zone, to which a vacuum or a negative pressure, respectively, of preferably between 1 and 40 mbar is applied.

In the following, the invention will be further explained by way of preferred exemplary embodiments illustrated in the drawing to which, however, it shall not be restricted. In detail, in the drawing,

DESCRIPTION OF THE PREFERRED EMBODIMENTS

Figure 1:
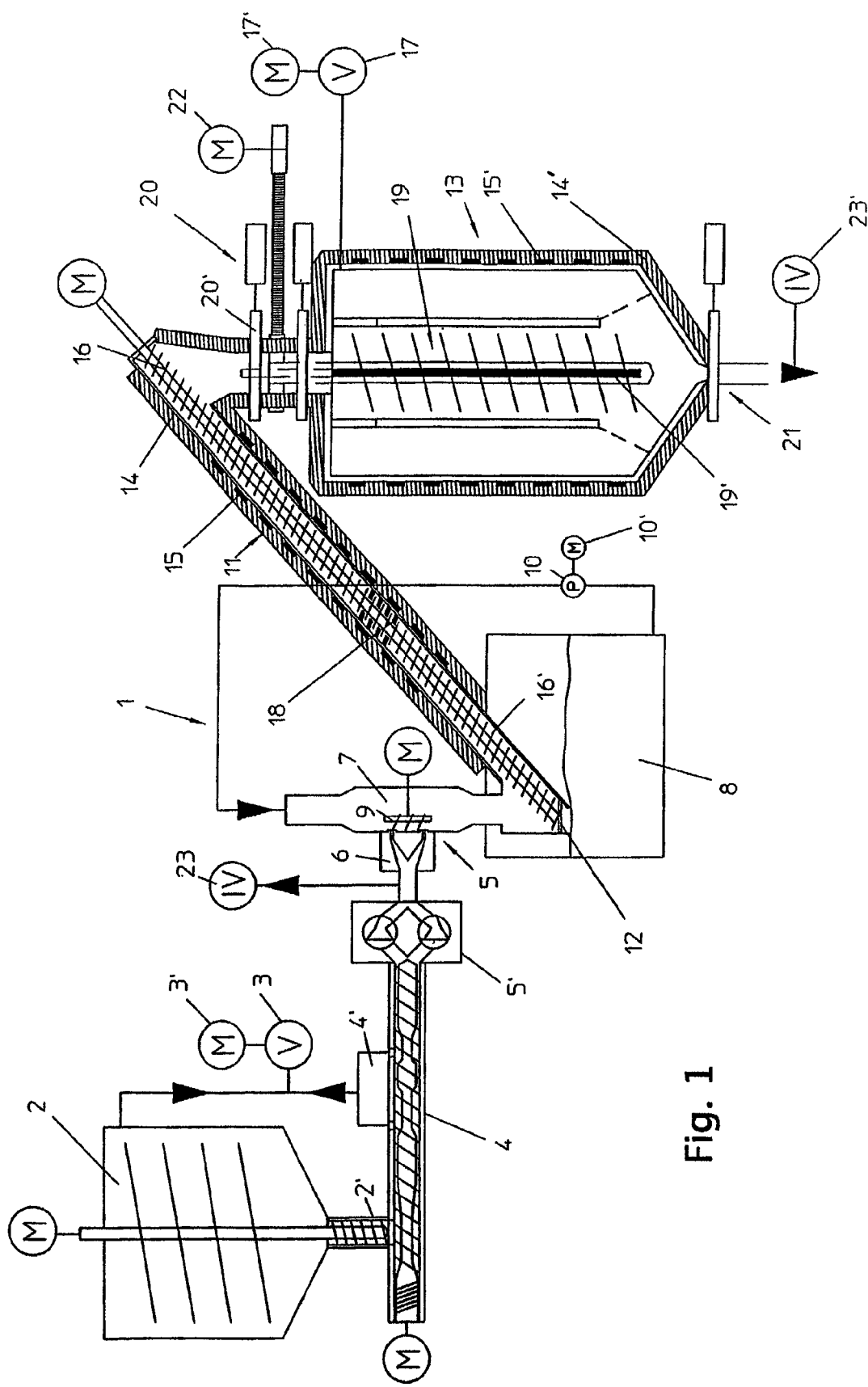
FIG. 1 shows a schematic view of an arrangement for increasing the intrinsic viscosity by means of solid state polymerization.

In FIG. 1, an arrangement and a method for increasing the intrinsic viscosity of polyester is shown, in which polyester starting material is introduced from a pre-drying container 2 via a plug screw 2' into an extruder 4. A vacuum system 3 driven by a motor 3' is connected to the pre-drying container 2 as well as to a degassing system 4' of the extruder 4 so as to reduce the water content in the polyester starting material and simultaneously withdraw water vapor and monomers from the melt.

Subsequently, the polyester starting material, after having been cleaned in a filtering device 5', is cut to pieces by means of an underwater granulating device 5. In doing so, the plastics strands emerging from a granulating head 6 are cooled in a cutting chamber 7 by means of a coolant 8 to only slightly below their melting temperature while they are being cut into particles by the cutters 9. The coolant 8 is conveyed into the cutting chamber 7 by means of a pump 10 driven by a motor 10'. As the coolant 8, e.g., water or a water-glycol mixture may be provided. The merely surface-cooled plastics strands are immediately cut by means of the cutters 9, and immediately after having been produced, the granules thus obtained are conducted in the direction of a screw conveyor 11, the granules being separated from the cooling water 8 by means of a screen 12 immediately after cooling, whereby the granules are cooled to only slightly below their melting temperature.

Via the screw conveyor 11, the granules then are conducted to a thermal treatment container 13, also termed SSP (solid state polymerization) reactor. The screw conveyor 11 has an insulation 14 and heating elements 15 so as to introduce the granules into the thermal treatment container 13 at a temperature as high as possible—yet below their melting temperature. Moreover, inwardly projecting mixing elements 18 are provided in a partial region on a tube 16' surrounding the screw 16, so as to mix the granules and to prevent the granules from sticking to one another.

The granules which thus still comprise a considerable residual heat are then conducted into the thermal treatment container 13 which may be closed via a vacuum-tight sluice 20 including a slide 20' relative to the screw conveyor 11. The thermal treatment container 13 merely has an insulated outer wall 14', in which heating elements 15' are provided. On account of the residual heat still present in the granules, the energy supply required for the solid state polymerization is considerably lower as compared to known SSP reactors. Moreover, a vacuum pump 17 driven by a motor 17' is provided in the thermal treatment container 13 so as to produce a vacuum of approximately 1-3 mbar.

Charging into and discharging from the thermal treatment container 13 may either be continuous or discontinuous. In case of discontinuous charging, it is suitable if the thermal treatment container 13 comprises a mixing element 19 for mixing the granules in the thermal treatment container 13, as shown in FIG. 1, to thus obtain a uniformly mixed material upon discharge. In the exemplary embodiment shown in FIG. 1, the mixing element 19 additionally comprises a heating element 19' provided in axial direction. A motor 22 is provided for driving the mixing element 19.

To obtain granules as uniform as possible, the intrinsic viscosity can be measured either by means of a so-called in-line viscosimeter 23 upon emergence from the extruder 4, or by means of a viscosimeter 23' upon emergence from the thermal treatment container 13 via sluice 21. By means of these viscosity measurements, the process parameters (temperature and dwell time in the thermal treatment container 13 as well as the drying time in the pre-drying container 2) can be controlled. Moreover, the vacuum system 3 for drying the polyester starting material and for cylinder degassing, respectively, can be controlled in dependence on the viscosity measured.

Figure 2:
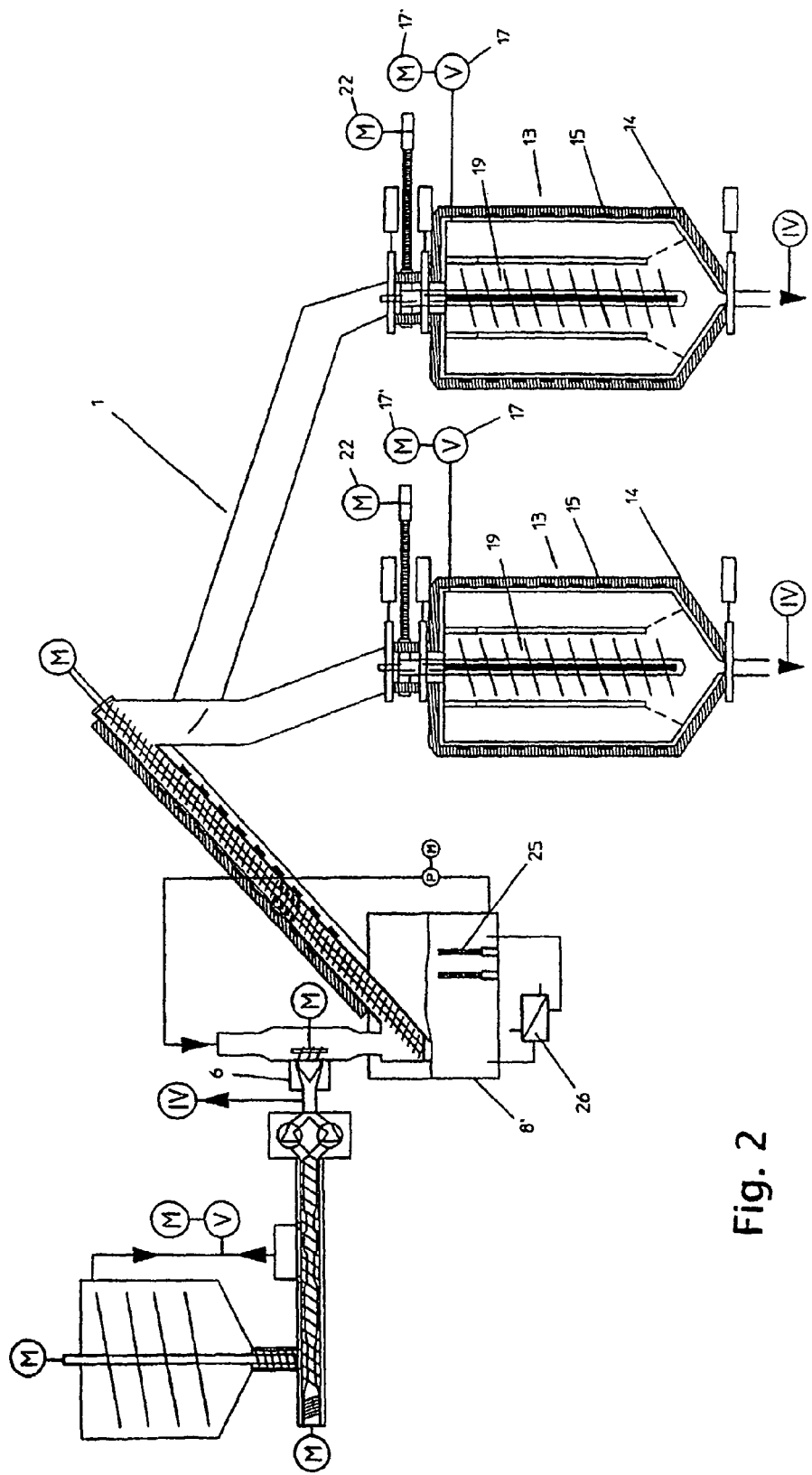
FIG. 2 shows a schematic view of an arrangement similar to FIG. 1, yet with two thermal treatment containers.

In FIG. 2, a comparable arrangement 1 is shown, wherein, however, two thermal treatment containers 13 are provided which may alternately be charged with granules in case charging is discontinuous. In addition, heating means 25 as well as a heat exchanger 26 are shown in the coolant storage container 8', via which the temperature of the coolant for cooling the plastics strands emerging from the granulating head 6 can be controlled. Otherwise, the arrangement of FIG. 2 corresponds to that of FIG. 1, rendering a repetition of its description unnecessary.

Figure 3:
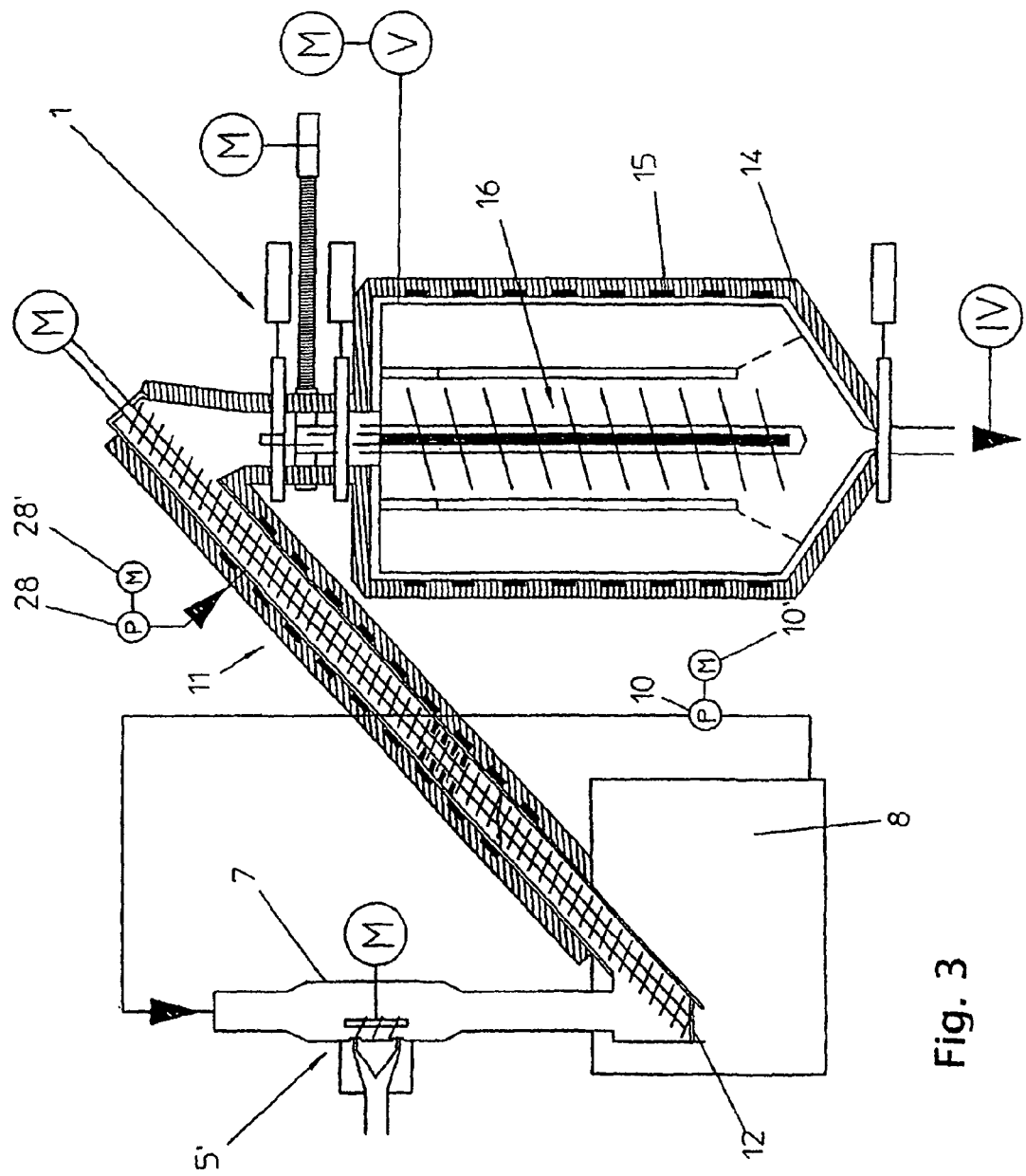
FIG. 3 shows a schematic view similar to FIGS. 1 and 2, yet with a pressurized coolant.

In FIG. 3, an underwater granulating system 5' is shown in which the coolant 8 is conveyed into a pressure-resistant cutting chamber 7 with the assistance of the pump 10 with approximately 6 bar. By this, the boiling temperature of the coolant 8 can be increased, and thus the granules can be prepared with a higher temperature. For a reliable transportation in the screw conveyor 11, the latter is pressurized, e.g. by approximately 5 bar in case of a pressure-resistant cutting chamber 7, a pump or a compressor 28, respectively, driven by a motor 28' being provided for this purpose.

Figure 4:
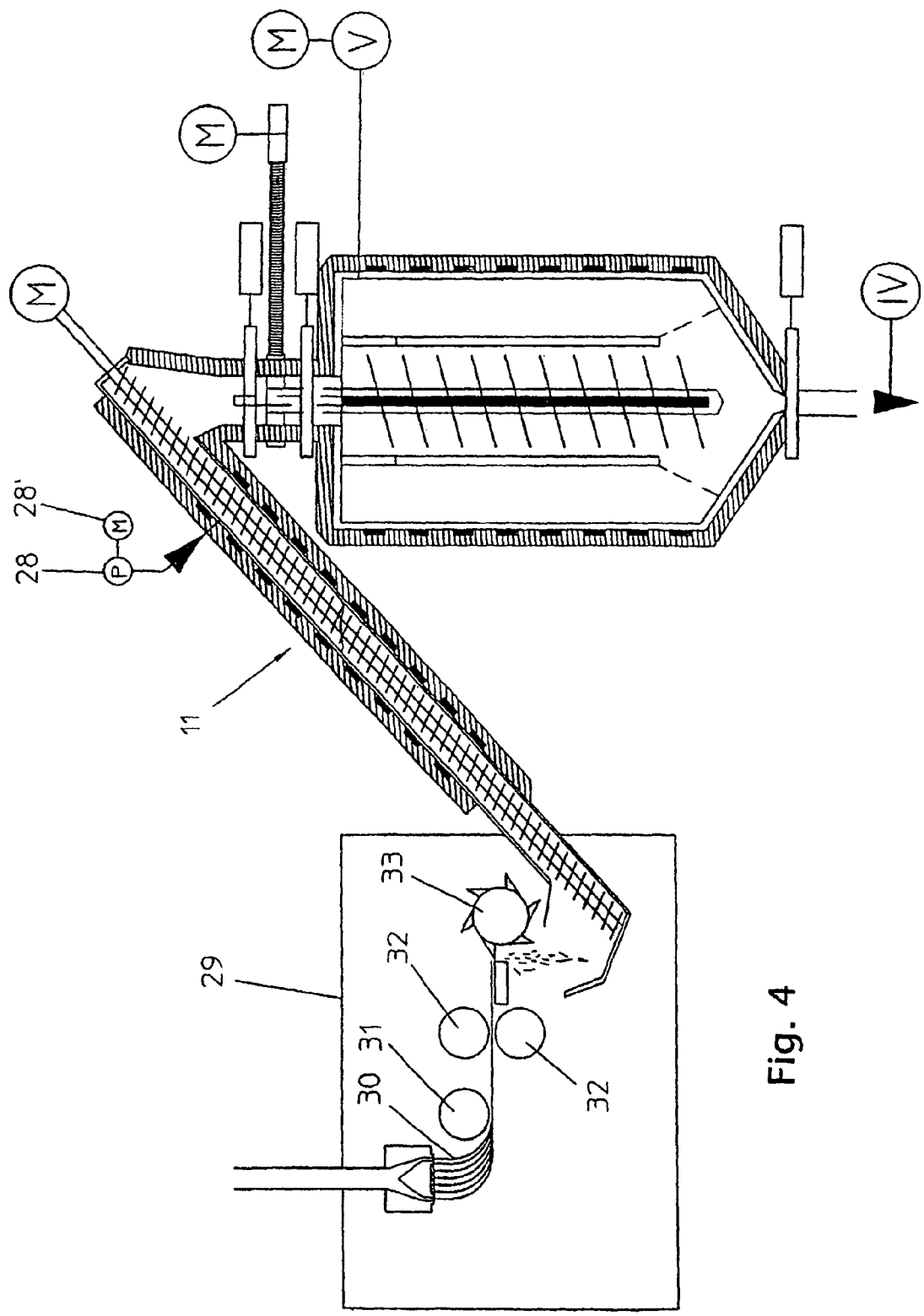
FIG. 4 shows a schematic view of an arrangement for increasing the intrinsic viscosity of polymers with a granulating roll.

In FIG. 4, granulation in a pressure chamber 29 with an enclosed, pressurized coolant is shown, the solidified plastics strands 30 being conducted via pressure rolls 32 from a granulating roll 31 to a cutter head 33. Here, too, a pump 28 is connected to the screw conveyor 11 so as to pressurize the screw conveyor 11 with air or inert gas, e.g. nitrogen.

Figure 5:
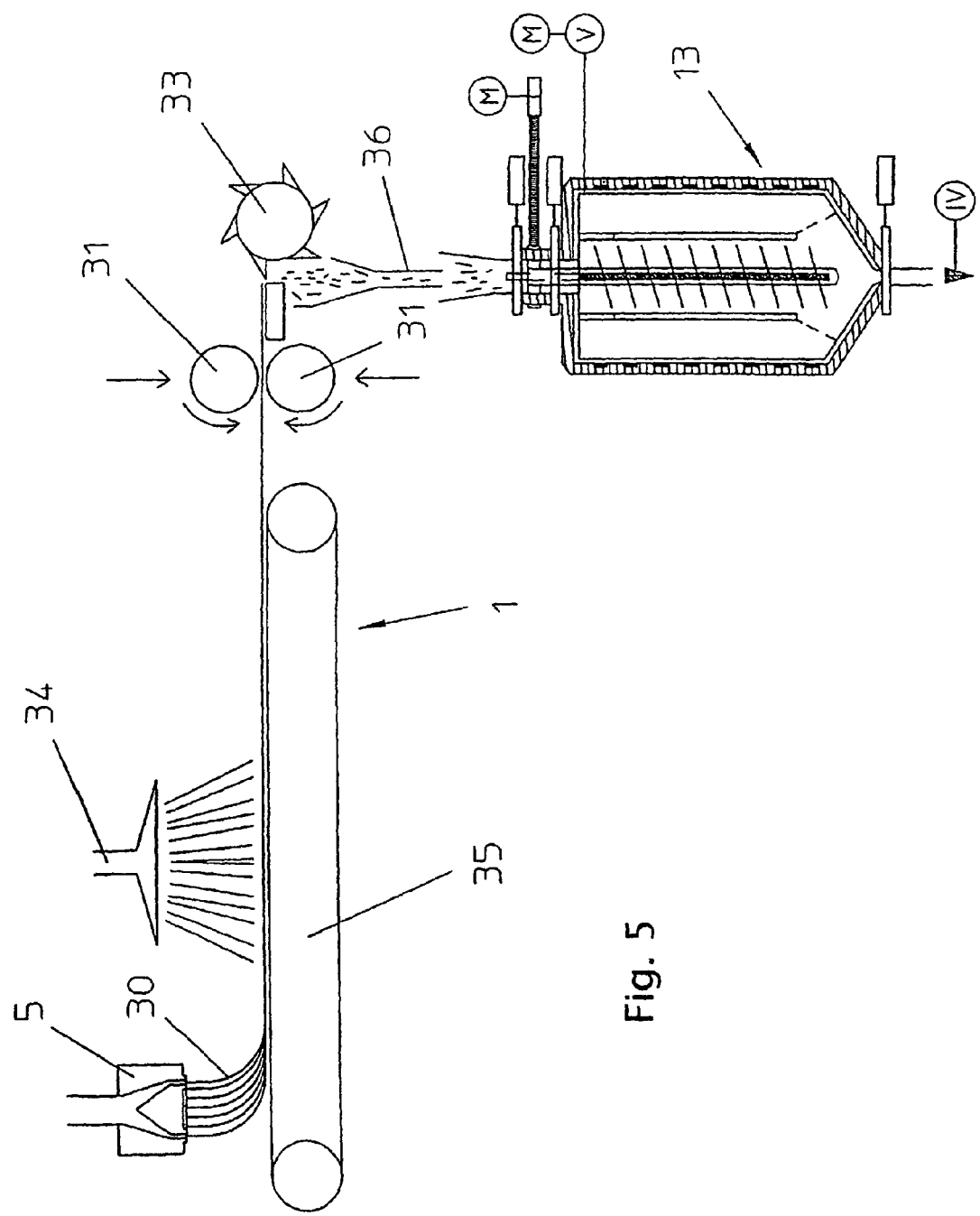
FIG. 5 shows a schematic view of an arrangement for increasing the intrinsic viscosity of polymers with a conveying belt and a device for spraying water as well as a gravity conveyance into the thermal treatment container.

FIG. 5 shows an alternative exemplary embodiment of the arrangement 1, in which the plastics strands 30 are only briefly cooled at their surfaces, a water spraying device 34 being provided for this purpose. The plastics strands 30 then are conducted to the cutter head 33 by means of a conveying belt 35. After granulation, the particles are further conveyed by gravity to the thermal treatment container 13 with the assistance of a funnel-type tubular duct 36.

Figure 6:
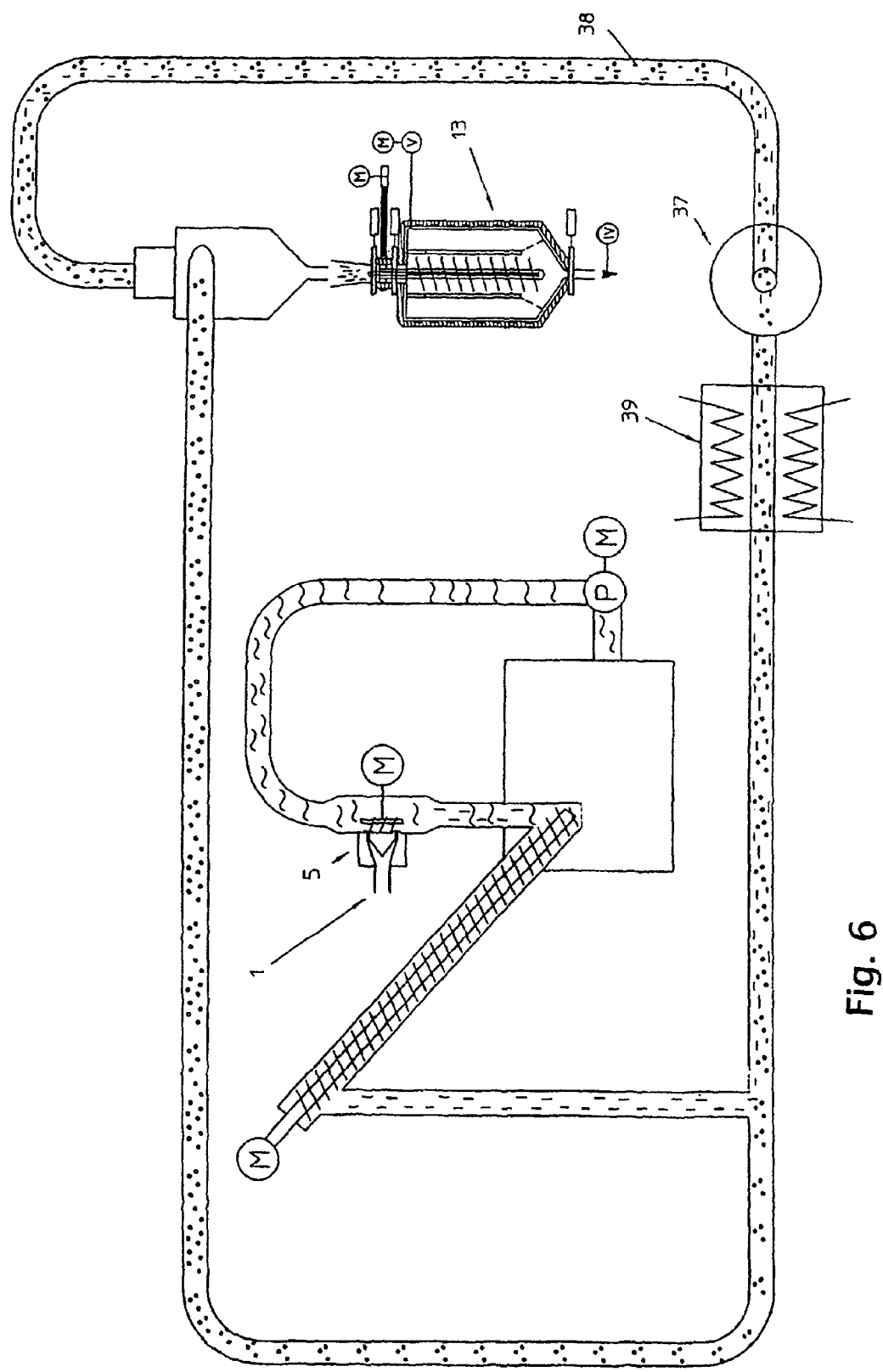
FIG. 6 shows a schematic view of an arrangement for increasing the intrinsic viscosity of polymers with a pneumatic conveyor.

As can be seen from FIG. 6, instead of the screw conveyor, also a pneumatic conveyor 37 may be provided to convey the granules from the granulating device 5 to the thermal treatment container 13 so as to transport the granules to the thermal treatment container 13 via a tubular duct 38. For heating the conveying air, a heating means 39 is provided.

Of course, conveyance from the granulating device to the thermal treatment container 13 as well as to granulating is conceivable also by other possible means, it merely being essential that the granules be produced slightly below their melting temperature and being conducted directly into the thermal treatment container by utilizing their residual heat.

In one test example using the arrangement according to the invention for increasing the intrinsic viscosity of polyester, the granules were separated from the cooling water 8 by means of the screen 12 and, via a screw conveyor 11 having a length of 2 meters and with mixing elements 18, supplied to the thermal treatment container 13 that was closed by means of the vacuum-tight sluice 20. The thermal treatment container 13 merely had a thermal insulation 14'. The thermal treatment container 13 was filled with approximately 200 kg of granules under a continuously applied vacuum of 1-3 mbar. Subsequently, the temperature of the granules in the thermal treatment container 13 was measured, a granule temperature of 212° C. adjusting in the container 13.

The granules were left in the thermal treatment container 13 under a vacuum of 1-2 mbar for 6 hours. After approximately 6 hours, the temperature of the granules in the thermal treatment container 13 was 185° C. The discharged granules were subsequently cooled by ambient air. A measurement of the intrinsic viscosity revealed an average IV value of 0.72-0.75 dl/g.

For a comparison, using a solid state polymerization arrangement according to the prior art, the granules were separated from water and subsequently dried in a centrifuge. Here, the cooling water temperature was 90° C. at a flow rate of approximately 15 m³/h. In a collecting container for the granules, a temperature of 40° C. to 70° C. was measured. The IV-value of the granules was 0.63-0.65 dl/g and thus was lower by approximately 0.1 dl/g than the value achieved with the inventive arrangement.

In both test, ground material from PET bottles having a residual moisture of less than 0.5% and a PVC portion of less than 10 ppm with approximately equal intrinsic viscosities IV of 0.71-0.74 dl/g was used. During degassing at the extruder, a vacuum of approximately 40 mbar negative pressure was applied by means of a water ring vacuum pump, since a higher vacuum would further reduce the degradation values at the extruder. The throughput of the extruder was approximately 220 to 240 kg/h at 125 screw revolutions per minute. The polyester starting material was processed at approximately 270° C. and then cut to granules with a particle diameter of between 3 and 3.5 mm by means of a standard underwater granulation.

Hence results that compared to known arrangements and methods, respectively, with the help of the arrangement according to the invention and of the method according to the invention, respectively, polyester with higher intrinsic viscosities on the average can be produced with a substantially lower energy consumption.

I claim:

1. Apparatus for increasing the intrinsic viscosity of polyester by solid state polymerization comprising
a supply of heated polyester material including an extruder for producing strands of the material,
a polyester granulator having a chamber housing a cutter for cutting the polyester material strands received from the extruder into granules while subjecting the strands to a coolant to only surface-cool the strands to a strand temperature slightly below the melting temperature of the polyester,
a screening device directly bordering the chamber for separating the granules from the coolant so as to maintain the granules at a temperature only slightly below the melting temperature of the polyester by receiving polyester granules and coolant directly from the chamber,
a solid state polymerization-thermal treatment unit including a polymerization-thermal treatment container, and
a screw conveyor receiving granules at a temperature only slightly below the melting temperature of the polyester directly from the screening device for transporting the granules from the screening device directly into an interior of the container to thereby utilize residual heat in the granules received from the conveyor during a polymerization process of the granules conducted in the interior of the container.

2. The apparatus according to claim 1, wherein said thermal treatment container is an unheated container, a thermally insulated container, or a container with a wall heating device.

3. The apparatus according to claim 1, which comprises at least one mixing element in said container.

4. The apparatus according to claim 3, wherein said mixing element is a heatable mixing element.

5. The apparatus according to claim 1, wherein said thermal treatment container is filled with an inert gas.

6. The apparatus according to claim 1, wherein said cutting chamber is filled with a liquid having a higher boiling point than water at ambient pressure.

7. The apparatus according to claim 6, wherein said liquid is a water/glycol mixture.

8. The apparatus according to claim 1, wherein said cutting chamber is a pressure chamber.

9. The apparatus according to claim 1, wherein said conveyor is a thermally insulated device.

10. The apparatus according to claim 1, wherein said conveyor is a heatable device.

11. The apparatus according to claim 1, which comprises a pre-drying unit disposed upstream of said granulator in a conveying direction.

12. The apparatus according to claim 11, wherein said pre-drying unit is a vacuum dryer or a hot air dryer.

13. The apparatus according to claim 1, wherein the extruder includes at least one degassing zone disposed upstream of said granulator in a conveying direction, and said extruder is subject to vacuum pressure.

14. The apparatus according to claim 13, wherein the vacuum in said extruder is between substantially 1 mbar and substantially 40 mbar.

15. Apparatus according to claim 1 wherein the thermal treatment container comprises an interior space subjected to a vacuum and has a container top with an intake opening receiving the granules from the conveyor and an exit opening at a bottom of the container for discharging the granules, the exit opening being arranged below the intake opening so that the granules flow gravitationally from the intake opening to the exit opening.

* * * * *